United States Patent [19]

Moreth

[11] Patent Number: 5,560,285

[45] Date of Patent: *Oct. 1, 1996

[54] ROASTING OVEN

[75] Inventor: R. Edward Moreth, Fort Lauderdale, Fla.

[73] Assignee: Remco Technologies, Inc., Fort Lauderdale, Fla.

[*] Notice: The term of this patent shall not extend beyond the expiration date of Pat. No. 5,373,778.

[21] Appl. No.: 409,061

[22] Filed: Mar. 23, 1995

[51] Int. Cl.$^6$ ..................................... A47J 37/04
[52] U.S. Cl. .................... 99/421 H; 99/448; 99/451
[58] Field of Search ..................... 99/419, 421 P, 99/473, 476, 480, 420, 421 H, 421 HH, 451, 479, 482, 446, 444, 425, 400

[56] References Cited

U.S. PATENT DOCUMENTS

| | | | |
|---|---|---|---|
| 2,097,793 | 11/1937 | Howell | 99/446 |
| 2,181,847 | 11/1939 | Finizio | 99/421 P |
| 2,262,910 | 11/1941 | Aller | 99/482 |
| 2,815,707 | 12/1957 | Morrow | 99/421 HH |
| 3,175,549 | 3/1965 | Bergsten | 99/421 |
| 3,196,776 | 7/1965 | Norton | 99/421 P |
| 3,413,912 | 12/1968 | Phelan et al. | 99/446 |
| 3,811,374 | 5/1974 | Mann | 99/446 |
| 3,951,052 | 4/1996 | Ringo | 99/421 P |
| 4,321,857 | 3/1982 | Best | 99/446 |
| 4,469,020 | 9/1984 | Hamilton et al. | 99/482 |
| 4,697,506 | 10/1987 | Ducate, Jr. | 99/482 |
| 4,867,051 | 9/1989 | Schalk | 99/421 P |
| 4,869,163 | 9/1989 | Haskins | 99/482 |
| 4,951,648 | 8/1990 | Shukla et al. | 99/451 |
| 5,184,540 | 2/1993 | Riccio | 99/421 P |
| 5,195,423 | 3/1993 | Beller | 99/482 |
| 5,373,778 | 12/1994 | Moreth | 99/412 H |

FOREIGN PATENT DOCUMENTS

| | | | |
|---|---|---|---|
| 2425346 | 12/1975 | Germany | 99/421 P |
| 322187 | 7/1957 | Switzerland | 99/421 |
| 356550 | 10/1961 | Switzerland | 99/421 H |

Primary Examiner—David Scherbel
Assistant Examiner—Tony G. Soohoo
Attorney, Agent, or Firm—M. K. Silverman

[57] ABSTRACT

A roasting oven including upper, lower, front, and rear walls and left and right end walls defining, in combination, a hollow envelope having a substantially curved upper surface, the housing including, within at least one of the front and rear walls, an opening for inserting and removing meats to be roasted to, in a normal state of operation, provide a continuously uninterrupted fluid communication between an oven interior defined by the walls, the envelope and the atmosphere; at least one infrared radiation element situated within said envelope of the oven housing, the element facing the oven interior to enable infrared radiation transmitted into the envelope to be reflected about the oven interior, the substantially curved upper surface of the envelope of the housing containing heated air to, in combination with directed radiated energy from the infrared element and reflected radiation therefrom, create sufficient oven temperatures within the substantially curved upper surface of the oven housing to accomplish advantageous roasting of meats; a spit assembly journalled within the housing; and drive means coupled to spit assembly for the movement thereof.

12 Claims, 7 Drawing Sheets

ROASTING OVEN

BACKGROUND OF THE INVENTION

1. Field of the Invention

This invention relates to an infrared roasting oven and, more particularly, is to an apparatus and process for cooking food items, particularly meats.

2. Description of the Prior Art

This application is directed to an improvement of my Roasting Oven as set forth in U.S. Pat. No. 5,373,778.

The prior art, is also represented by U.S. Pat. No. 4,321,857 (1982) to Best, entitled Infrared Gas Grill. The teaching of Best relates to a grill assembly primarily in the nature of a smoking system. Best differs from the instant invention in that it employs a process of open cooking, that is a grill-type system. Best, as a open air system, relies solely upon convection of heat for the cooking process, whereas the present invention, as more fully described below, employs a combination of convection and radiant infrared energy for the effective operation thereof. Accordingly, while Best and the instant invention make certain use of infrared heating, the respective invention otherwise have little relationship to each other.

Other prior art known to the inventor include U.S. Pat. No. 4,214,516 (1980) to Friedl entitled Barbecue Oven. The oven of Friedl, which is commercially marketed as the HART ROTISSERIE, does not employ a heat chamber notwithstanding its use in infrared burners therein, nor does it burn wood or any other solid fuel. Further, the system of Friedl exhausts gas and heat out of the top of the cooking cabinet, this in distinction to the herein described inventive structure which employs (as is more fully described below) a compressive high temperature heat chamber at the top of a cylindrical oven. Friedl, employing a square cabinet, is not able to make use of heating zones in the sense of this roasting oven.

Other prior art known to the inventor includes U.S. Pat. No. 4,757,756 (1988) to Van Marr, entitled Transportable Outdoor Barbecue Grill. The structure of Van Marr is that of an outdoor barbecue which allows all heat generated therein to escape out of a special purpose flue, thereby obviating the possibility of compressive heating in the sense of my system.

Further prior art known to the inventor is U.S. Pat. No. 5,184,540 (1993) to Riccio, entitled Cooking Apparatus With Rotisserie and Reclamation Trap. The teaching thereof is essentially that of an rotisserie oven in which the spit rotates at a greater rate than the drive member thereof. Also, Riccio employs a reclamation trap disposed beneath the spit to recover juices produced during the cooking of food therein.

SUMMARY OF THE INVENTION

The instant invention constitutes a roasting oven including a housing having respective upper, lower, front and rear walls which, in combination, define a hollow envelope having a substantially curved upper surface, said housing having a longitudinal axis which, together with right and left end walls, define an oven interior. Within at least one of said front and rear walls is provided an opening for inserting and rotating meats to be roasted to, in a normal state, provide a continuously uninterrupted fluid communication between said oven interior and the atmosphere. The inventive oven further includes at least one infrared radiation element within said envelope facing the interior thereof such that radiation therefrom is reflected from said cylindrical wall toward said oven interior and such that curvature of said upper wall retains hot air which co-acts with energy radiated from said infrared radiation element on said upper wall and with a quantity of said reflected radiation to create sufficient temperatures in said curved upper surface of the oven to thereby effect a nutritious and naturally-tasting cooked product. The roasting oven further includes a conduit communicating with the oven interior at a level below said curved upper surface of said envelope of said housing.

It is, an object of the invention to provide a infrared roasting oven which employs reflection of radiant infrared thermal energy to effect a more thorough and natural tasting roasting process.

It is another object to furnish a infrared roasting oven, having zones of intermediate and high temperature, which employs both convective and radiant infrared energy.

It is further object of the invention to provide an infrared roasting oven of the above set forth type in which the exhaust means thereof selectively withdraws air and heat to effect differential thermal zones.

It is a yet further object to provide an infrared roasting oven in which the cooking process is primarily a function of duration of exposure to infrared radiant energy, as opposed to convection heat.

A still further object of the invention to provide a infrared roasting oven in which the degree of humidity and circulation of air therein is regulated for purposes of maximizing taste-enhancing smoke from wood burning therein.

It is a still further object to provide a roasting oven of the above type which combines the advantages of infrared, flicker flame, and wood cooking methods.

The above and yet other objects and advantages of the invention will become apparent with the hereinafter set forth Brief Description of the Drawing, Detailed Description of the Invention, and claims appended herewith.

DETAILED DESCRIPTION OF THE INVENTION

In FIGS. 1, 2, 3 and 4 are shown the essential structure of the invention, in which the main body of the oven is advantageously shaped as an elongate substantially cylindrical oven body 1 having an upper side 2, a bottom side 3, a front side 4, a right hand side 6, a left hand side 7 and a rear side 8.

Figure 10:
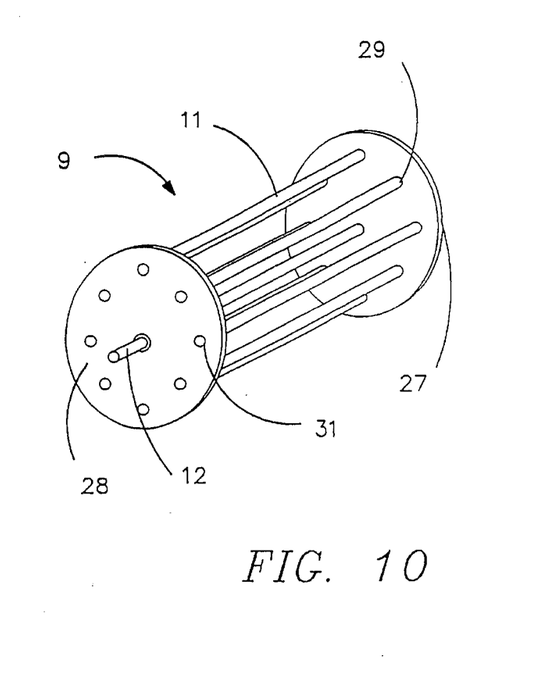
FIG. 10 is a diagrammatic perspective view showing the rotating spit assembly.

A spit assembly 9 (see FIGS. 2 and 10) fills the major part of an interior of the oven body and serves to support meat pieces to be roasted, such as chickens and pork end roasts. The spit assembly 9 is composed of a set of parallel spits 11 on which the meat is skewered. The spit assembly 9 is supported on a rotating shaft 12 that is journalled on bearings in the end sides 6, 7 of the oven body 1. The rotating shaft 12 has, on either end, a sprocket wheel 13 coupled by a chain 14 to a motor M which rotates that spit assembly at some slow speed, e.g., three revolutions per minute. At the very rightmost end, the shaft 12 supports an index disc 17 external to the oven body that rotates with the shaft 12 and has, marked on its perimeter, a number of sectors, equal to the number of spits in the spit assembly, for example, eight spits as shown in FIG. 10. The sectors can be marked with, for example, eight different colors or with numbers or letters or both, so that the operator of the oven can identify meat on each spit or keep apprised of its roasting time by noting the position of respective sectors of the index disc 17 on a control chart (see FIG. 7). Each sector is aligned with its corresponding spit such that the sector faces forward when the corresponding spit is opposite an opening 11A in the oven body 1.

It is to be understood that said opening 11A within the front side 4 of the oven body 1 provides for the insertion and removal of meats to be roasted. However, more importantly, opening 11A provides (in its normal state of operation) for a continuously uninterrupted fluid communication between the oven interior and atmosphere. Thereby a process of substantially cold cooking, but for the cooking action within upper zone 26 (more fully described below), is accomplished. It is noted that opening 11A is normally non-closable and such openings can be situated within rear side 8 of the oven body.

Figure 2:
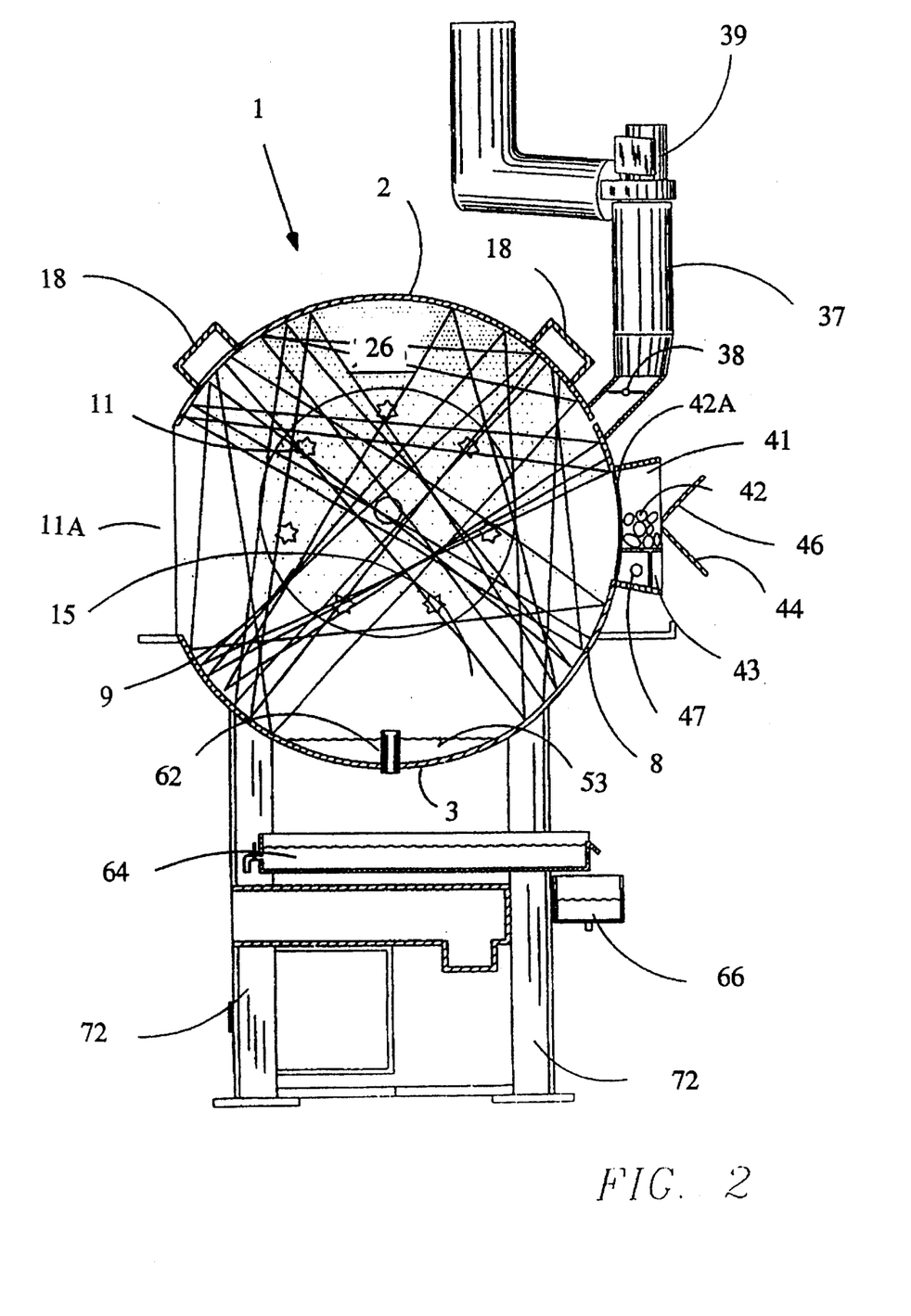
FIG. 2 is right cross-sectional view of the invention seen along the Line 2—2 of FIG. 1.
Figure 3:
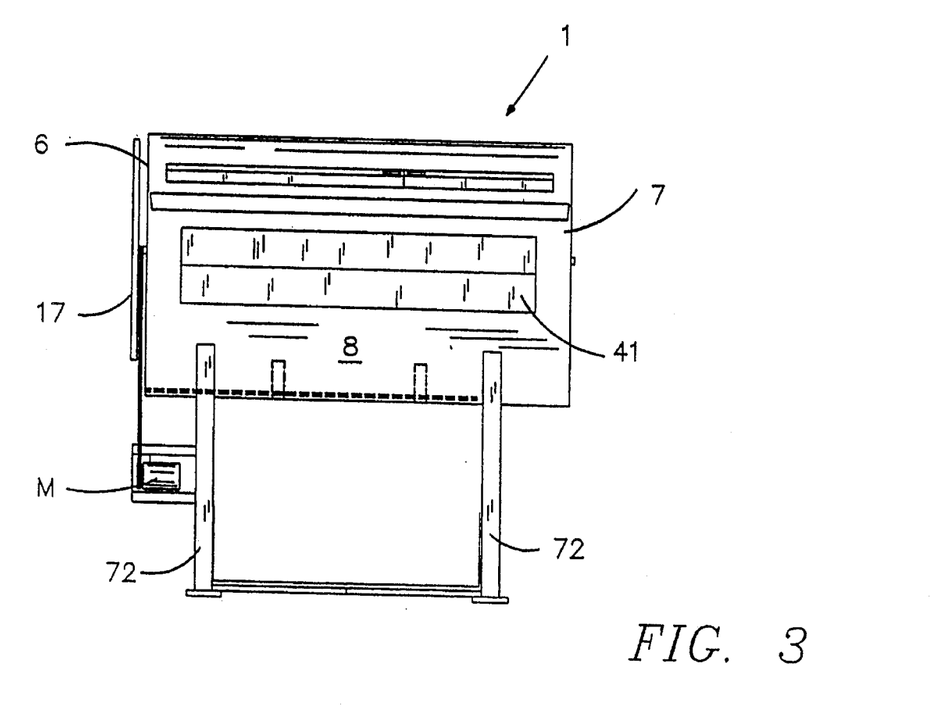
FIG. 3 is an elevational rear side view thereof.
Figure 4:
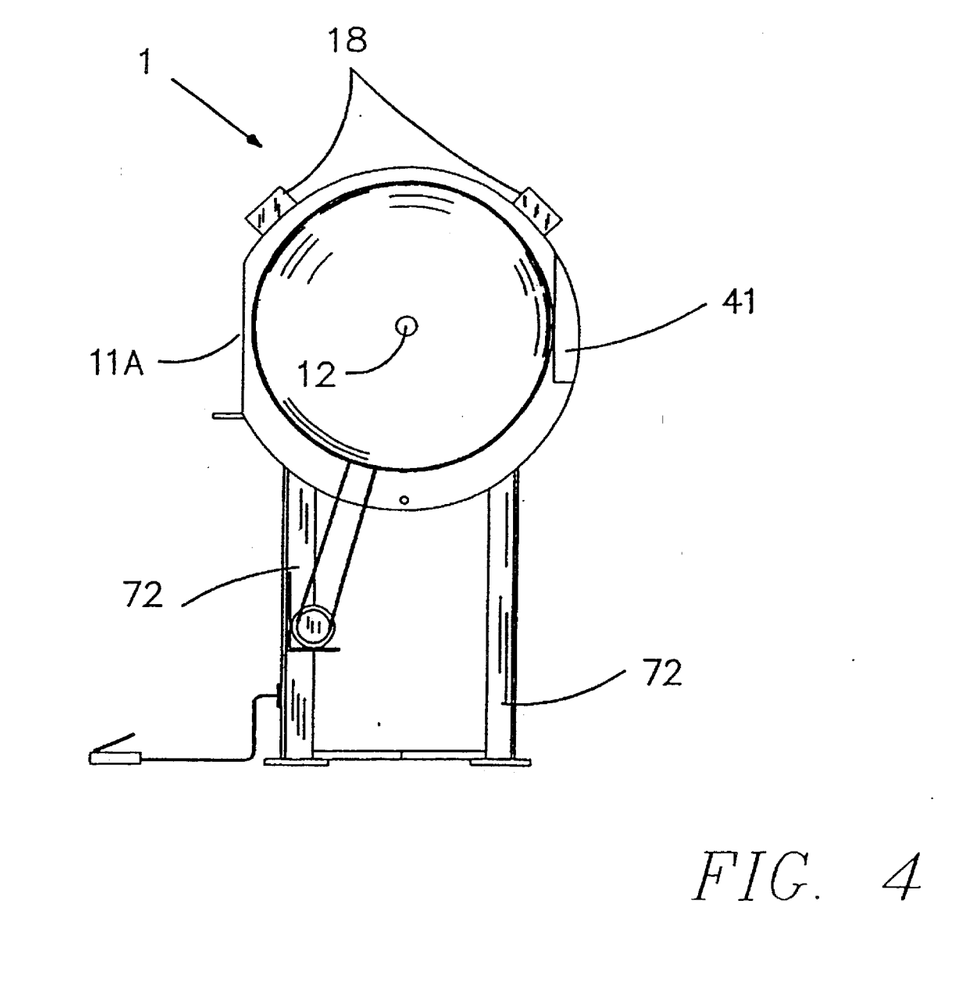
FIG. 4 is an elevational side view of the invention showing the index disc and other details.

One or more infrared radiation elements 18 are installed within the oven body 1, and serve to direct infrared radiation into the oven interior, in which such radiation is reflected back and forth between the inner walls so as to fill the interior with reflected infrared radiation creating temperature zones as indicated by dashed lines in FIG. 2. An upper zone 26, defined by a substantially curved upper surface of upper side 2, comprises a substantially higher temperature area than lower zone 15, as is more fully described below.

Figure 5:
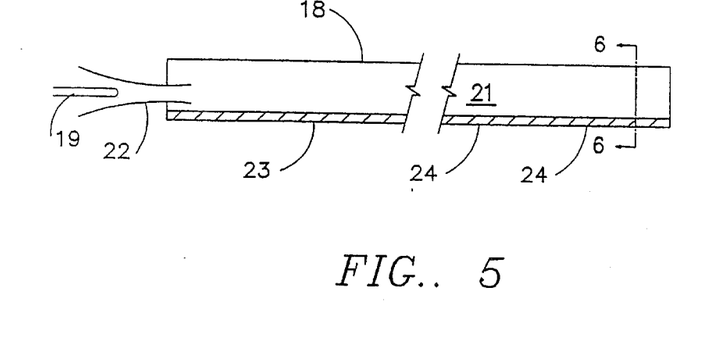
FIG. 5 is a diagrammatic cross-sectional fragmentary view showing an infrared radiation element.
Figure 6:
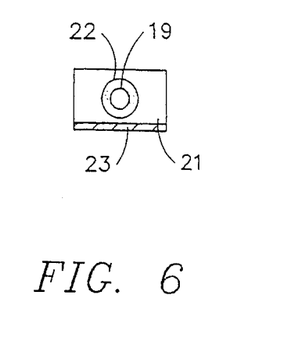
FIG. 6 is an elevational end cross-sectional fragmentary view seen along the Line 6—6 of FIG. 5.

FIGS. 5 and 6 are structural views of typical infrared radiation elements 18, which include a gas jet for injecting combustible gas into a tubular radiator body 21 of rectangular cross-section. A venturi 22 surrounding the gas jet 19 serves to draw atmospheric air to support combustion of the gas into the elements 18. A fireproof wall 23, facing the interior of the oven in formed of perforated high temperature ceramic material having small flame outlet holes 24 which serve to maintain the fireproof wall 23 at, advantageously, 1700° F. That is, the roasting oven according to the invention includes said infrared radiation elements 18, each formed as said tubular body 21, the gas jet 19 injecting gas at one end of the body. Venturi 22 surrounds the gas jet which supplies air to support combustion of the gas. A slot in the tubular body receives perforated ceramic heater modules for emitting a burning gas-air mixture into the oven interior, wherein the perforated ceramic modules emit infrared radiation into the oven interior.

As the meat pieces skewered on the spits 11 rotate with the rotating spit assembly, they are constantly exposed to the infrared radiation from all directions and are cooked to a high degree of tenderness without loss of flavor or moisture. The upper zone 26 of the oven interior (see FIG. 2 and 4) is filled with heated air generally at 500° to 1100° F. which sears and roasts the skin of the meat pieces to a uniform golden color tone which much enhances the looks and flavor of the meat, and helps to retain meat juices. Accordingly, at the upper zone 26, and in the curved region thereof, occurs a intensified heating of trapped superheated air through (1) direct heat rays of the radiation elements and reflected rays caused by a lens effect of interior shiny stainless steel at the curved bottom of the oven (2) absorbed energy through the heavy construction of the oven; and (3) heat generated by burning gas within the radiant elements. Which causes the metal thereof, upon heating, to itself become a radiant, giving-off mild infrared energy.

With reference to FIG. 2 an exhaust conduit 37, with an adjustable damper 38, serves to exhaust some air from the roaster interior to the outside via in one embodiment, an exhaust fan 39, while drawing in enough fresh dry air to provide circulation and exhaust, without degrading the high temperature of upper zone 26. Fan 39 thereby exhausts humidity from the oven, reducing sweating of meat and of spices applied thereto.

It is thereby to be appreciated that in a process of cooking meats the inventor has discovered that the best results in regard to tenderness and taste of the roasted meat are attained with the use of infrared heat radiation as opposed to convection heat, this combined with (1) various means for maintaining the right degree of humidity and air circulation inside the cooking chamber, and (2) a controlled degree of the intensity and duration of the infrared radiation. In addition, it has been found that the infrared cooking process can be combined with the injection of taste-enhancing smoke from burning woods into the infrared radiated cooking chamber. Thereby the combination of controlled infrared radiation, reduced humidity, air circulation, and presence of smoke, lead to a superior cooked product.

Figure 9:
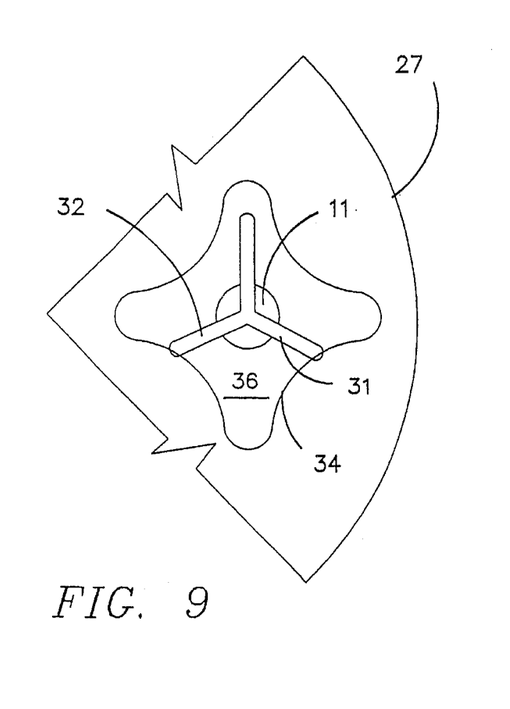
FIG. 9 is a diagrammatic fragmentary enlarged detail view showing a star-shaped end of a spit with a step-ahead arrangement.

As the spit assembly 9 (see FIG. 10) rotates about the shaft 12, each spit rotates with regard thereto. To this end the spit is rotatable within a pair a aligned holes 29, 31, in two opposite end plates 27, 28, centered on the rotatable shaft 12. In FIG. 9, one end of each spit 11 is shaped like a star 31 with, for example, three arms or spokes 32 that couple with a step-ahead arrangement 34 in the end plate 27 having, for example, four arms 36. As the end plate rotates, the star 31 advances one quarter of a revolution for each turn of the end plate 28, in relation to the end plate 27, and also to the spit assembly 9. In that manner the meat on the spits 11 is constantly rotated in relation to the infrared elements 18, for an even more uniform exposure and browning without overexposure on one side or underexposure on the other side.

Figure 14:
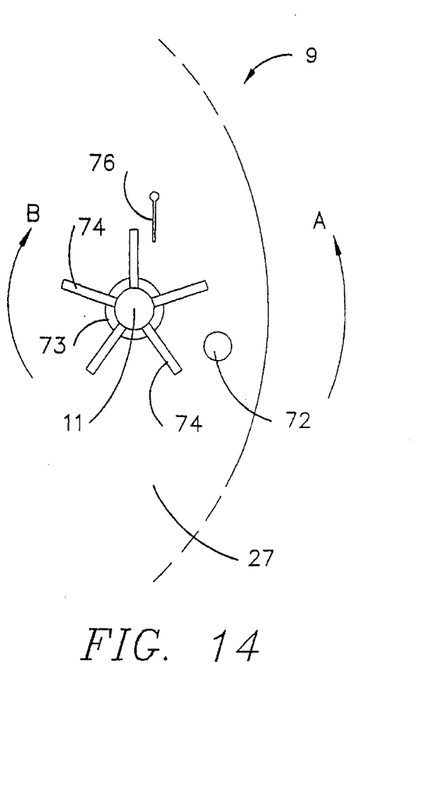
FIG. 14 shows an alternate step-ahead arrangement for the spits on the assembly.

An alternative step-ahead arrangement for rotating the spit 11 is shown in FIG. 14, wherein the spit 11 turns in a bearing 73 in the spit assembly end plate 27 (see FIG. 10). The end plate exhibits a set of radially extending star spokes 74, e.g. five star spokes. A bumper post 72 is rigidly attached to the oven end plate (see FIG. 14), within reach of the star spokes. As the spit assembly turns in the direction indicated by Arrow A, the spit is turned one increment (e.g. one fifth) of a turn as the bumper post 72 advances the oncoming star spoke 74, turning the spit in relation to the spit assembly 9, as indicated by Arrow B, one increment. A spring element 76 allows another spoke 74 to advance, and prevents the spit 11 from turning back against the spring element 76.

A wood chamber 41 (see FIG. 2) is mounted on the back side 8 of the oven body and contains pieces 42 of aromatic wood, such as oak, hickory, mesquite or the like. The wood chamber is forward bounded by a grille 42A of, for example, of expanded metal, so that wood smoke can enter the oven chamber 26 to enhance the flavor of the meat as it cooks. An ash chamber 42 below the wood chamber 41 serves to collect burned wood ashes. An ash door 44 provides access to the ash chamber 41 for loading wood in the chamber.

Figure 11:
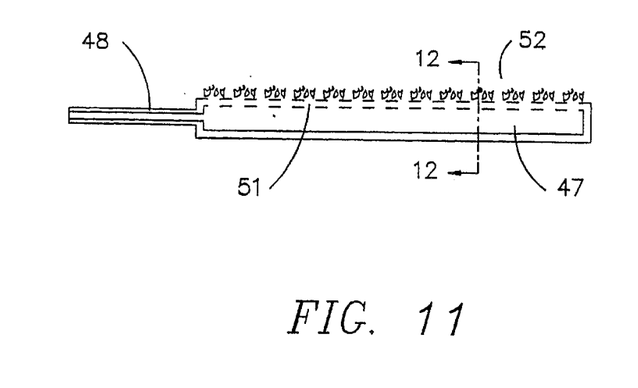
FIG. 11 is a lateral cross-sectional view of the flicker light burner.
Figure 12:
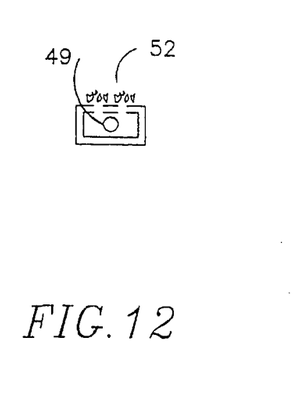
FIG. 12 is a cross-sectional view seen along the Line 12—12 of FIG. 11, showing the interior construction of the flicker light burner.

A so-called flicker flame including a gas-fed burner 47 (see FIG. 2) is located below the wood chamber 41 and serves to throw a flickering gas light through the grille 42, which illuminates the back of the oven interior and maintains fire in the wood 42 in the wood chamber 41. FIGS. 11 and 12 show respective elevational sectional side views and end views of the flicker flame burner 47 which has a gas inlet 48 for drawing air into the burner, which has a plurality of holes 51 that issue a row of small gas streams 52. Vermiculite granules 49 are located in the path of the gas stream to disperse the gas.

Figure 1:
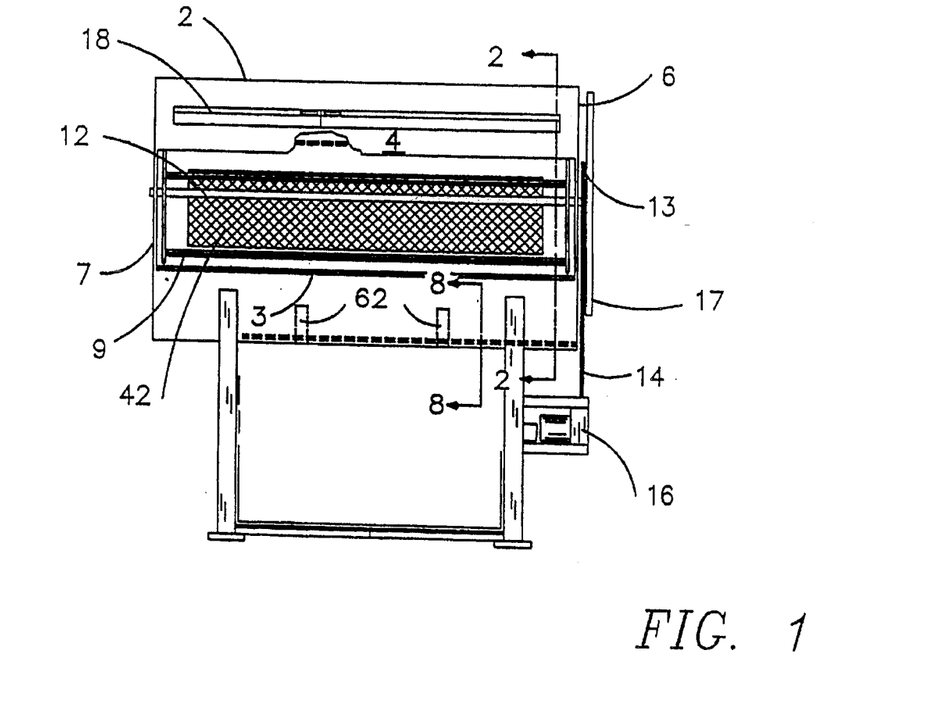
FIG. 1 is an elevational front view of the invention.
Figure 8:
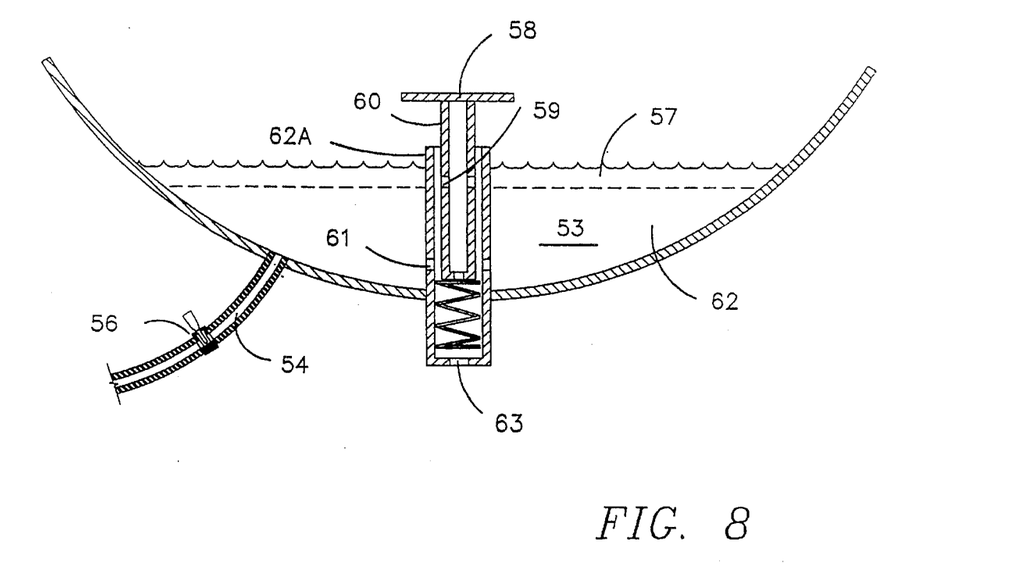
FIG. 8 is an end diagrammatic cross-sectional fragmentary detail view along the Line 8—8 of FIG. 1.

In FIG. 8 it may be seen that bottom part of the oven chamber 26 forms a water chamber 53 adapted to contain a pool of water, supplied through a water line 54, with a water cock 56. During cooking meat juices and meat fat collect in the water chamber 53, wherein the fat floats as a layer or a pool of meat juices and water, forming a gravy 62 which can be topped off by pushing down a spring-loaded valve 58, as shown in FIG. 8. By pushing down the valve 58, holes 59 in the valve stem 60 align with holes 61 in the stand pipe 62a so that the gravy 62 can be drawn from a gravy drain hole 63 into a juice pan (FIG. 1). After the gravy is removed, the liquid grease 57 can be drawn off into a grease trap 66 (FIG. 2) and discarded.

Figure 13:
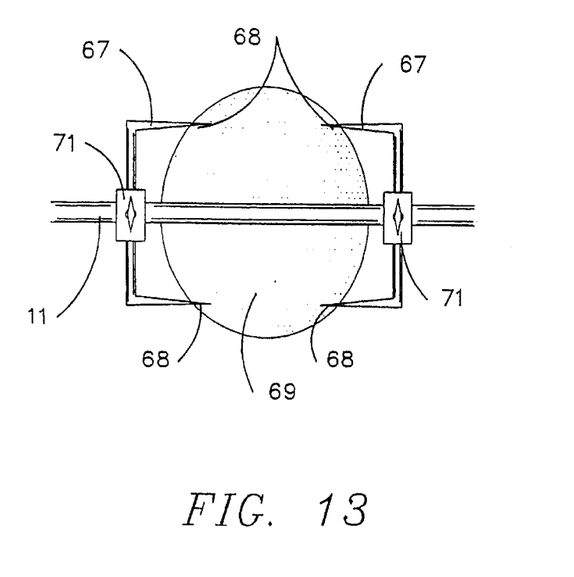
FIG. 13 is a diagrammatic view showing details of the spit with meat grippers.

The spits 11 are advantageously equipped with slidable meat grippers 67, as shown in FIG. 13, having pointed tines 68 that are inserted into the meat 69 and hold it during cooking. Each gripper 67 is secured to the spit 11 by set screws 71.

Figure 7:
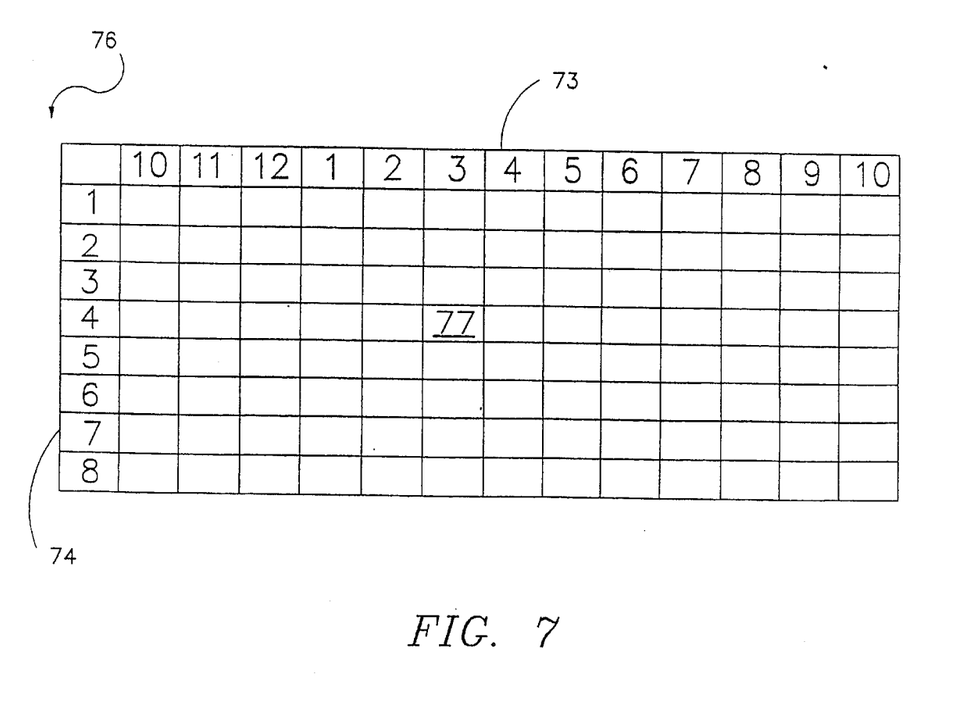
FIG. 7 is a diagram showing a control chart for cooking several batches of meat in different time segments.

FIG. 7 shows an exemplary cooking schedule 76 with a horizontal axis 73 for marking cooking start and stop times, and a vertical axis, indicating Sectors 1 to 8 of the index wheel 17, each sector indicating a corresponding spit. The chef operating the oven can easily mark on a schedule 76, in the respective time fields 77, the start and stopping time for cooking each batch of meat on a spit corresponding to a sector 74 on the schedule 76. In this manner it is easy for the chef to keep track of all the meat cooking in the oven at all times.

The entire oven body 1 may be mounted on legs 72.

Figure 15:
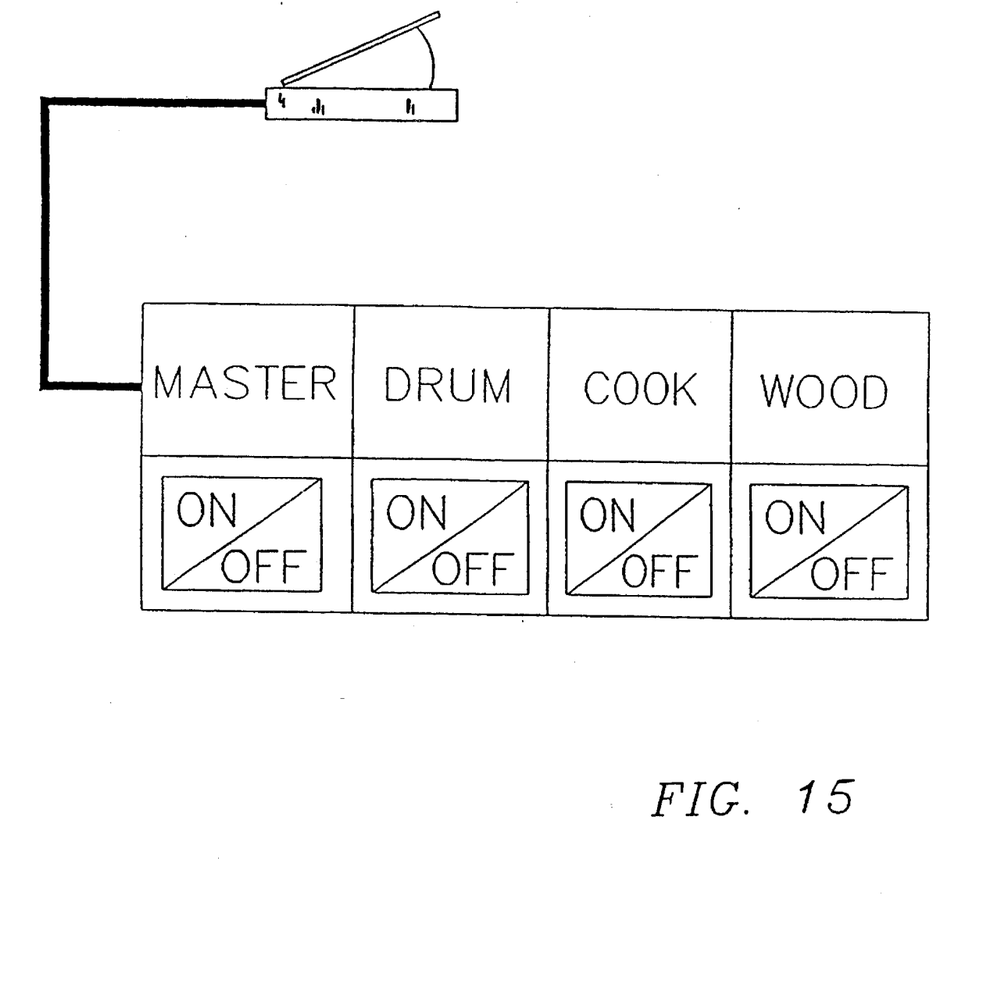
FIG. 15 is a view of the control panel for the invention system.

FIG. 15 shows the control panel for the inventive system.

While there has been shown and described the preferred embodiments of the present invention it is to be appreciated that the invention may be embodied otherwise than is herein and specifically illustrated and described and that, within the scope of such embodiment, certain changes may be made within the detail and construction of the parts without departing from the underlying idea of principles of this invention and within the scope of the appended claims.

Having thus described my invention what I claim as new, useful and non-obvious and, accordingly, secure by Letters Patent of the United States is:

1. A roasting oven, comprising:
    (a) a housing having respective upper, lower, front and rear walls, and left and right end walls, said walls defining, in combination, a hollow interior envelope having a substantially curved upper surface thereof, said housing including, within at least one of said from and rear walls thereof, an opening for removing and inserting products to be roasted to thereby provide a continuous and uninterrupted fluid communication between said hollow interior envelope and said atmosphere;
    (b) at least one infrared radiation element situated within said envelope of said oven housing, said element facing said oven interior to enable infrared radiation transmitted into said envelope to be reflected about said interior of the oven to heat a food product situated therewithin, said substantially curved upper surface of said envelope combining heated air to, in combination with directed radiated energy from said infrared element and reflected radiation therefrom, create sufficient oven temperatures within said upper surface of said oven housing to accomplish an advantageous roasting of meat products;
    (c) a spit assembly journalled within said housing;
    (d) drive means coupled to said spit assembly for the rotational movement thereof, said drive means including means for passing said products affixed to said assembly thru an arc of rotation and thereby into a zone of intensified heating generally defined by said substantially curved upper surface of said oven housing;
    (e) internal to said infrared radiation element, an elongate body;
    (f) a gas jet for injecting gas at one end of said body;
    (g) a venturi surrounding said gas jet for supplying air to support combustion of said gas; and
    (h) a slot in said elongate body for receiving perforated modules for emitting a gas-air mixture for combustion into said oven interior, said perforated modules emitting infrared radiation into said oven interior.

2. A roasting oven, comprising:
    (a) a housing having respective upper, lower, front and rear walls, and left and right end walls, said walls defining, in combination, a hollow interior envelope having a substantially curved upper surface thereof, said housing including, within at least one of said front and rear walls thereof, an opening for removing and inserting products to be roasted to thereby provide a continuous and uninterrupted fluid communication between said hollow interior envelope and said atmosphere;
    (b) at least one infrared radiation element situated within said envelope of said oven housing, said element facing said oven interior to enable infrared radiation transmitted into said envelope to be reflected about said interior of the oven to heat a food product situated therewithin, said substantially curved upper surface of said envelope containing heated air to, in combination with directed radiated energy from said infrared element and reflected radiation therefrom, create sufficient oven temperatures within said upper surface of said oven housing to accomplish an advantageous roasting of meat products;

(c) a spit assembly journalled within said housing;

(d) drive means coupled to said spit assembly for the rotational movement thereof, said drive means including means for passing said products affixed to said assembly thru an arc of rotation and thereby into a zone of intensified heating generally defined by said substantially curved upper surface of said oven housing;

(e) an flicker flame burner disposed proximally to a wall of said oven and facing said interior envelope to provide a flickering light for illuminating said interior envelope of said housing;

(f) an elongate burner body within said flicker flame burner;

(g) a gas inlet in at least one segment of said burner body; and (h) openings in said burner body for ejecting streams of gas to mix with air for combustion of a gas-air mixture thereof.

3. The roasting oven as recited in claim 2, further comprising:

a rotating index disk integrally radially depending from a shaft of said spit assembly, said disk including a plurality of sectors marked upon said index disk, each sector corresponding to a respective spit of said spit assembly, for externally indicating a position for each spit.

4. The roasting oven as recited in claim 2, in which said at least one infrared element comprises means for generation of temperatures in excess of 500 degrees Fahrenheit.

5. The roasting oven as recited in claim 2, further comprising:

a chamber, for the burning of wood, in atmospheric communication with said interior envelope of said oven.

6. The roasting oven as recited in claim 1, further comprising a flue-type conduit in fluid communication with said oven interior.

7. The roasting oven as recited claim 6, further comprising:

a fan, within said conduit, including damper means for selectively discharging a limited quantity of air from said oven interior while allowing retention of heated air within said substantially curved upper surface of said upper wall thereof.

8. The roasting oven as recited in claim 7, further comprising:

a wood burner, facing said opening of said housing;

an ash box located below said wood burner for catching wood ashes from said burner, and a grill separating said oven interior from said wood burner.

9. The roasting oven as recited in claim 6, further comprising:

a damper in said flue type conduit comprising means for selectably controlling the amount of air discharged from said oven interior.

10. The roasting oven as recited in claim 2, further comprising:

in said spit assembly comprising a plurality of spits for mounting meat to be roasted, said spits disposed parallel with said rotating shaft in a virtual cylindrical surface having a given radius from said rotating shaft.

11. The roasting oven as recited in claim 10, further comprising:

spit turning means connected with each of said spits for turning each of said spits relative to said spit assembly during roasting.

12. The roasting oven as recited in claim 11, further comprising:

two end plates mounted at opposite ends of said rotating shaft, each end plate having mutually aligned peripheral holes for receiving respective spits in said holes, said spit turning means including for each spit a star-shaped body on each spit, and a respective star-shaped circumference in said mutually aligned peripheral holes in at least one of said two end plates, said star-shaped body having a number of spokes being smaller than the number of spokes in said star-shaped circumference.

* * * * *